(12) United States Patent
Tuhro et al.

(10) Patent No.: US 10,047,862 B2
(45) Date of Patent: Aug. 14, 2018

(54) TRANSMISSION PARK CONTROL WITH INTEGRATED BRAKE FUNCTION

(71) Applicant: Continental Automotive Systems, Inc., Auburn Hills, MI (US)

(72) Inventors: Matthew Conrad Tuhro, Sault Ste. Marie, MI (US); Vesa Bilhelm Luomaranta, Sault Ste. Marie (CA); Daniel Gregory Goodrich, Cedarville, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/353,303

(22) Filed: Nov. 16, 2016

(65) Prior Publication Data

US 2017/0146123 A1 May 25, 2017

Related U.S. Application Data

(60) Provisional application No. 62/259,772, filed on Nov. 25, 2015.

(51) Int. Cl.
*B60T 7/12* (2006.01)
*F16H 63/48* (2006.01)
*B60T 13/74* (2006.01)
*B60T 17/22* (2006.01)

(52) U.S. Cl.
CPC ............ *F16H 63/486* (2013.01); *B60T 7/122* (2013.01); *B60T 13/74* (2013.01); *B60T 13/741* (2013.01); *B60T 17/22* (2013.01)

(58) Field of Classification Search
CPC .......... B60T 13/741; B60T 7/12; B60T 7/126; B60T 7/02; B60T 7/005; F16H 61/0059; F16H 63/486; F16H 61/20
See application file for complete search history.

(56) References Cited

U.S. PATENT DOCUMENTS 5,696,679 A * 12/1997 Marshall ................ B60T 1/005
192/222
6,396,395 B1 * 5/2002 Zielinski .................. B60Q 1/50
180/271

(Continued)

FOREIGN PATENT DOCUMENTS

| JP | 2006137218 A | 6/2006 |
|---|---|---|
| JP | 2006137219 A | 6/2006 |
| JP | 2008126962 A | 6/2008 |

OTHER PUBLICATIONS

Japanese Office Action dated Nov. 6, 2017 for corresponding Japanese patent application No. 2016-228972.

*Primary Examiner* — Yuri Kan

(57) ABSTRACT

A method of controlling a transmission park control system for a vehicle comprises receiving a shift request from a transmission controller, wherein the shift request is not completed by the transmission and reporting the shift request from the transmission controller to the transmission park control system. Various vehicle sensors are monitored to detect motion of the vehicle. Detected motion and the shift request are compared to determine that a transmission park control brake action is desired. A brake system is requested to apply one of an electronic parking brake and/or a vehicle service brake to bring the vehicle velocity to zero and hold the vehicle velocity at zero.

10 Claims, 3 Drawing Sheets

(56) References Cited

U.S. PATENT DOCUMENTS

| | | | | |
|---|---|---|---|---|
| 9,028,015 | B2* | 5/2015 | Klusemann | B60T 7/12 192/13 A |
| 2004/0036349 | A1* | 2/2004 | Lin | B60T 7/02 303/15 |
| 2009/0036266 | A1* | 2/2009 | Kondou | B60T 7/126 477/92 |
| 2011/0257859 | A1* | 10/2011 | Brueggemann | B60T 7/12 701/70 |
| 2012/0136543 | A1* | 5/2012 | Jang | F16H 61/0059 701/53 |
| 2013/0268171 | A1* | 10/2013 | Huls | F16H 63/486 701/70 |
| 2015/0219213 | A1* | 8/2015 | Neumann | F16H 61/20 701/50 |
| 2015/0344007 | A1* | 12/2015 | Lee | B60T 7/12 701/70 |

* cited by examiner

TRANSMISSION PARK CONTROL WITH INTEGRATED BRAKE FUNCTION

TECHNICAL FIELD

The invention relates to vehicles brake systems and, more particularly, to a brake system that can be used to provide brake torque when the a transmission park control function has failed or is degraded.

BACKGROUND

Vehicles may use electronic actuation to initiate a transmission shift request. The transmission shift request can only be completed when the vehicle is not moving. When shifting from Park to a drive gear, the brake system may be instructed to hold driver applied brake pressure until the shift request can be completed. However, when the shift request is to shift from a drive gear to Park or another direction of motion, the driver applied brake pressure may not exist or may be released before it can be held, such as before the vehicle reaches zero velocity. Therefore, driver applied brake pressure cannot be held to complete the shift request. In such instances, the transmission may be shifted into a neutral gear rather than the gear requested. Additionally, it is desired to shift the transmission into the requested gear in a smooth manner that does not jerk the vehicle and operator.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a transmission park control system for a vehicle comprises receiving a shift request from a transmission controller, wherein the shift request is not completed by the transmission and reporting the shift request from the transmission controller to the transmission park control system. Various vehicle sensors are monitored to detect motion of the vehicle. Detected motion and the shift request are compared to determine that a transmission park control brake action is desired. A brake system is requested to apply one of an electric parking brake and or at least one vehicle service brake to bring the vehicle velocity to zero and hold the vehicle velocity at zero.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
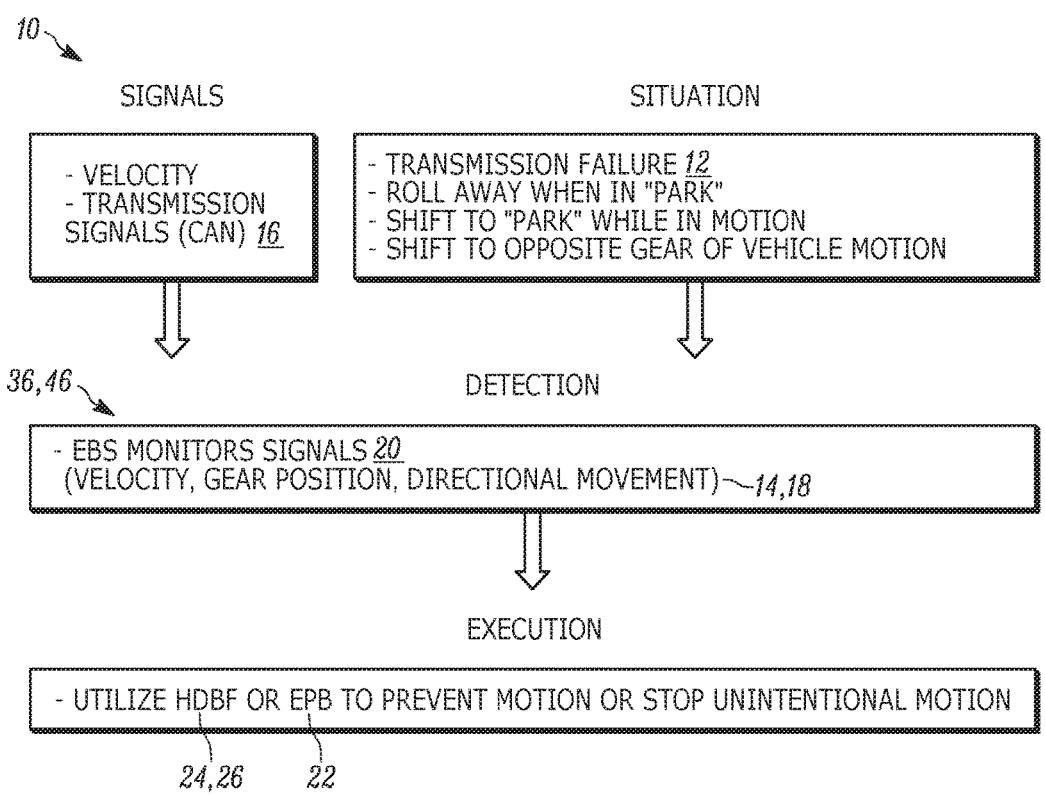
FIG. 1 is a schematic diagram of a first embodiment of a vehicle with a brake system to support a transmission park control function of the present invention.

The following description is merely exemplary in nature and is in no way intended to limit the disclosure, its application, or uses. For purposes of clarity, the same reference numbers will be used in the drawings to identify similar elements. With reference to FIG. 1, a block diagram of a transmission park control (TPC) system for a vehicle, is shown, generally indicated at 10, in accordance with an embodiment. The TPC system 10 includes a transmission 12 which has an electronic control unit (ECU) 14 for transmission control and is connected to a vehicle area network (CAN) 16 to communicate with other systems and sensors, in particular, a second ECU 18 for an electronic brake system (EBS) 20. Although a CAN 16 is described herein other method of communication with the ECU 14 and second ECU 18 may also be used. One skilled in the art would be able to determine the best communication system for a particular vehicle architecture.

The brake system 20 also includes an electric parking brake (EPB), generally indicated at 22, associated with a service brake system. The transmission park control function can be used to control shifting of the transmission into Park. Additionally, TPC 10 may shift the transmission 12 into the park gear when an EPB 22 has been engaged for a predetermined amount of time.

The service brake system is preferably a conventional, hydraulic brake system 20, but can be of any brake system 20, such as a brake-by-wire type brake system. The second ECU 18 is associated with at least one wheel brake or service brake 24 which can be actuated by an actuator 26. However, a wheel brake 24 and associated actuator 26 can be provided for each or other wheels of the vehicle. The ECU 18 is connected to the actuators 26 for causing actuation. Based on vehicle input information from sensors and requests at the second ECU 18, such as driver braking demand, demands of a slip control system (ABS: antilock brake system, TCS: traction control system) or driver assistance system (ESC: electronic stability control), a decision on a desired control mode is made by the ECU 18 and is transmitted to actuator(s) 26 to control the wheel brake(s) 24 in the conventional manner, such as disclosed in U.S. Pat. No. 8,606,477, the content of which is hereby incorporated by reference into this specification. The brake system 20 is capable of controlling brake pressure independent of driver braking demand.

The TPC system 10 may use the transmission ECU 14, the brake system ECU 18 or another ECU. In the example described below the TPC system 10 uses the brake system ECU 18. The TPC system 10 assists in shifting the transmission 12 from a drive gear to a park gear when there is degradation of the transmission, a driveline failures such as a broken axle or broken driveshaft, when there is a failure to shift, or when there is a driver misuse situation. For example, the transmission 12 is shifted into the park gear, but due to degradation there is a potential for the vehicle to roll. Alternately, the TPC ECU 18 recognizes there is degradation or failure in the transmission 12 and requests support from the brake system 20. If a driver requests to shift the transmission to Park while the vehicle is still in motion or if the driver requests to shift the transmission 12 to a gear that opposes current motion, e.g. the driver shift from Drive to Reverse while the vehicle is moving forward, the TPC ECU 18 may request support of the brake system 20. In the situations described, the brake system 20 can apply the brakes 24 with a hydraulic dynamic brake force (HDBF) on the service brake 24 or with the EPB 22 to support the TPC system 10.

Referring to FIG. 1, the brake system 20 monitors various vehicle sensors, for example wheel speed sensors to detect if the vehicle is moving. Relevant information detected by the brake system 20 can be reported through the CAN 16 to the TPC ECU 18 (if a different ECU) to determine if a TPC action 30, 40 is needed. Additionally, the TPC system 10 monitors various sensors and systems, transmission, brake, etc. The EBS ECU 18 evaluates the information, velocity, direction of motion, current gear position, shift requests, transmission degredation, etc. and determine if a TPC brake action 30, 40 is needed.

Figure 2:
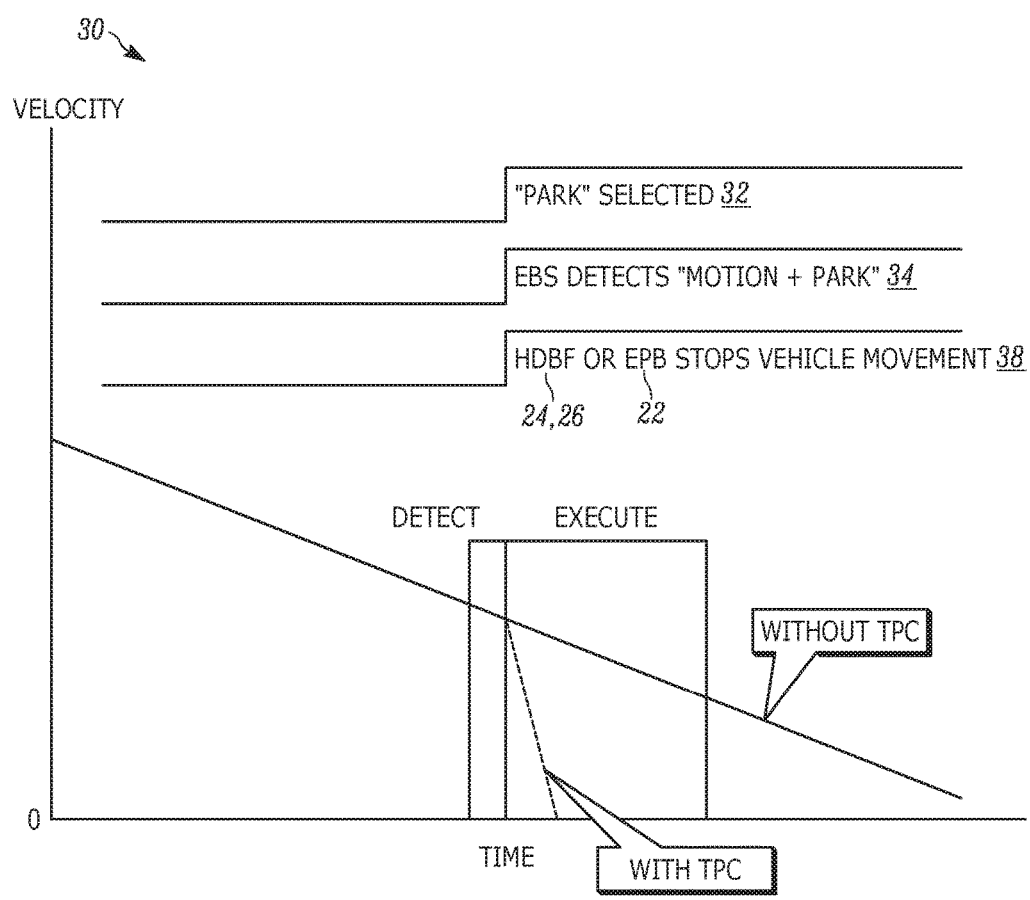
FIG. 2 is a schematic diagram of a first embodiment depicting an example of driver abuse of the transmission part control of the present invention.

FIG. 2 illustrates a first embodiment of when a TPC brake action 30 can be used, when the vehicle is in motion and a shift request is received. The shift request can be a shift-to-Park request, or a request to shift into a gear for an opposing motion. The transmission ECU 14 reports to the TPC system 10 when the transmission 12 has been requested to shift, step 32. The transmission can only complete the shift request if the vehicle is already at a velocity of 0. The brake system 20 monitors various sensors, such as wheel speed sensors, to determine that the vehicle is still in motion, and reports to the TPC system 10, step 34. The TPC ECU 18 compares the detected motion and the shift request and determines that a TPC brake action is desired, step 36. The TPC ECU 18 requests that the brake system 20 brake the vehicle using the HDBF and/or the EPB, step 38. The brake system 20 applies the brakes at the request of the TPC system 10 and independent of driver brake apply. Therefore, the brake system 20 may be required to independently build brake pressure to complete the request. As shown the first TPC brake action 30 brings the vehicle to zero velocity more quickly allowing the transmission to complete the shift request.

Figure 3:
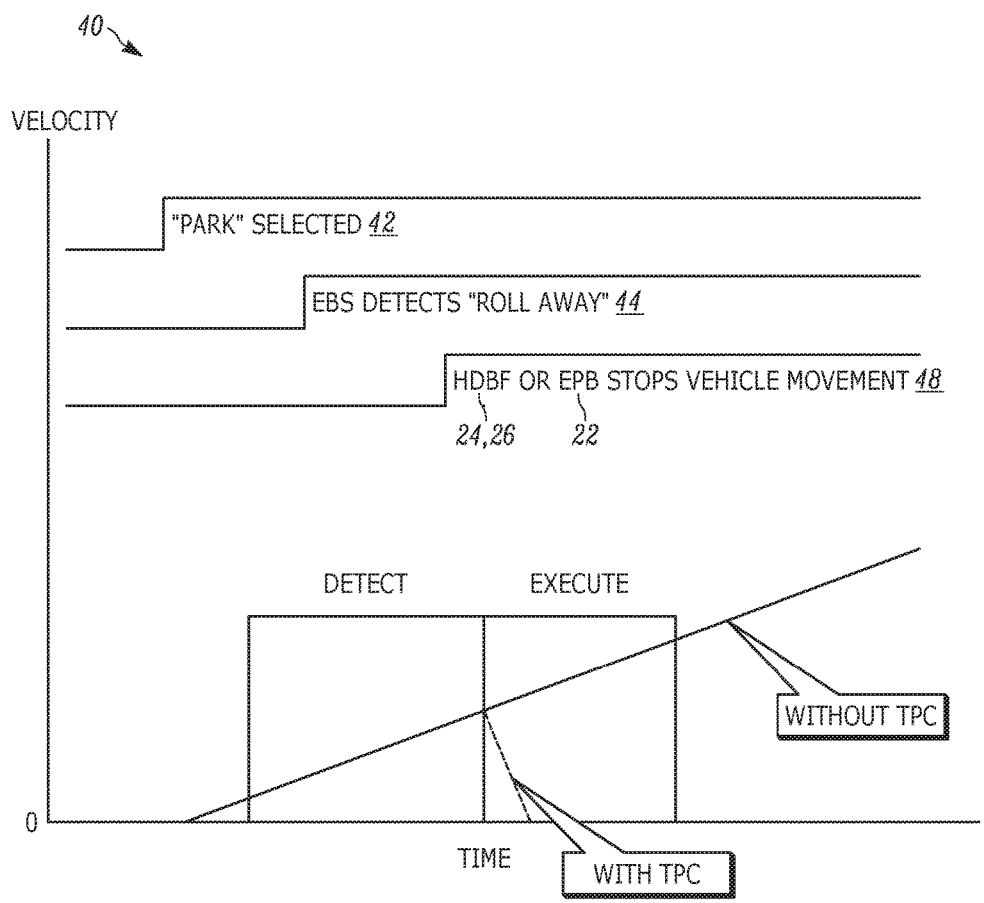
FIG. 3 is a schematic diagram of a second embodiment depicting an example of transmission failure of the transmission part control of the present invention.

FIG. 3 illustrates a second embodiment of when a TPC brake action 40 can be used, when the vehicle is not in motion and a shift request is received, but not completed, such as when there is a broken parking pawl or other component preventing the shift request from completing. The shift request can be a shift-to-Park request, or a request to shift into a gear for an opposing motion. The transmission ECU 14 reports to the TPC system 10 when the transmission 12 has been requested to shift, step 42. However, although velocity of the vehicle is 0 the shift request is not completed due to failure by the transmission 12 or the transmission ECU 14. For example, if the transmission is cold and the shift request is not completed prior to a driver removing brake apply, a degraded wire within the system, etc.

The brake system 20 monitors various sensors, such as wheel speed sensors, to determine that the vehicle resumes motion, and reports to the TPC system 10, step 44. The TPC ECU 18 compares the detected motion and the shift request and determines that a TPC brake action is desired, step 46. The TPC ECU 18 requests that the brake system 20 brake the vehicle using the HDBF and/or the EPB, step 48. The brake system 20 applies the brakes at the request of the TPC system 10 and independent of driver brake apply. Therefore, the brake system 20 may be required to independently build brake pressure to complete the request. As shown, the second TPC brake action 40 returns the vehicle to zero velocity allowing the transmission to complete the shift request. Further brake action of a continuos pressure hold and/or on EBS activation can prevent vehicle velocity if the shift request can not be completed due to failure.

Although in FIG. 1, the service brakes can include, or are associated with the parking brake members of the EPB, it can be appreciated that the service brakes can be separate from the parking brake members. Both the parking brake members and the service brakes can then be controlled by the control unit 18.

The operations described herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a transmission park control system for a vehicle comprising:
   receiving a shift request with a transmission controller, wherein the shift request is not completed by the transmission;
   reporting the shift request from the transmission controller to the transmission park control system;
   monitoring various vehicle sensors to detect motion of the vehicle;
   comparing detected motion and the shift request to determine that a transmission park control brake action is desired; and
   requesting a brake system to apply one of either an electronic parking brake and at least one vehicle service brake to bring the vehicle velocity to zero and hold the vehicle velocity at zero.

2. The method of claim 1, further comprising completing the shift request of the transmission after the vehicle velocity is zero.

3. The method of claim 2, wherein the shift request is a shift-to-Park request.

4. The method of claim 2, wherein the shift request is a request to shift to an opposing direction of motion.

5. The method of claim 1, wherein the shift request is not completed by the transmission because the vehicle is still in motion at a time of the shift request.

6. The method of claim 1, wherein the shift request is not completed by the transmission due to operation error of one of: the transmission and the transmission controller.

7. The method of claim 1, wherein the shift request is not completed due to failure of a component for one of: a driveline system and a parking brake system.

8. The method of claim 1, wherein the requesting a brake system to apply one of either the electronic parking brake and the at least one vehicle service brake includes building pressure within the brake system independent of application of a brake pedal by a vehicle operator.

9. The method of claim 1, further comprising monitoring various vehicle sensors subsequent to the shift request to detect motion of the vehicle.

10. The method of claim 1, further comprising determining the vehicle velocity is zero prior to receiving a shift request.

\* \* \* \* \*